(12) United States Patent
Schneidmiller et al.

(10) Patent No.: US 7,886,481 B2
(45) Date of Patent: Feb. 15, 2011

(54) FLYING INSECT TRAP

(75) Inventors: Rodney G. Schneidmiller, Greenacres, WA (US); Qinghe Zhang, Spokane, WA (US)

(73) Assignee: Sterling International Inc., Spokane, WA (US)

( * ) Notice: Subject to any disclaimer, the term of this patent is extended or adjusted under 35 U.S.C. 154(b) by 304 days.

(21) Appl. No.: 12/052,663

(22) Filed: Mar. 20, 2008

(65) Prior Publication Data

US 2008/0263938 A1 Oct. 30, 2008

Related U.S. Application Data

(60) Provisional application No. 60/913,994, filed on Apr. 25, 2007.

(51) Int. Cl.
*A01M 7/00* (2006.01)
(52) U.S. Cl. .......................... 43/122; 43/107; 43/132.1
(58) Field of Classification Search .................. 43/122, 43/107, 132.1, 133, 121
See application file for complete search history.

(56) References Cited

U.S. PATENT DOCUMENTS

| 38,277 | A | | 4/1863 | Bassett | |
|---|---|---|---|---|---|
| 149,918 | A | | 4/1874 | Clough | |
| 218,175 | A | | 8/1879 | Hollingshead | |
| 836,052 | A | | 11/1906 | Pool | |
| 862,079 | A | | 7/1907 | Lenthier | |
| 1,715,958 | A | * | 6/1929 | Strand | 43/122 |
| 1,858,087 | A | * | 5/1932 | Howard | 43/107 |
| 2,478,104 | A | * | 8/1949 | Johnson | 43/122 |
| 3,059,373 | A | | 10/1962 | Gardner | |
| 3,320,692 | A | | 5/1967 | Hellen | |
| 3,885,341 | A | | 5/1975 | Kuchenbecker | |
| 4,044,494 | A | | 8/1977 | Grajnert | |
| 4,244,135 | A | * | 1/1981 | Harwoods | 43/122 |
| 4,551,941 | A | * | 11/1985 | Schneidmiller | 43/107 |
| 4,876,822 | A | | 10/1989 | White | |
| 5,231,792 | A | * | 8/1993 | Warner | 43/122 |
| 5,392,560 | A | * | 2/1995 | Donahue et al. | 43/122 |
| 5,522,171 | A | * | 6/1996 | Mandeville | 43/122 |
| 5,557,880 | A | * | 9/1996 | Schneidmiller | 43/122 |
| 6,158,165 | A | | 12/2000 | Wilson | |
| 6,289,629 | B2 | | 9/2001 | Greening | |
| 6,910,298 | B2 | | 6/2005 | Schneidmiller | |
| 7,412,797 | B1 | * | 8/2008 | Hiscox | 43/122 |
| 2005/0028430 | A1 | | 2/2005 | Schneidmiller | |
| 2006/0236592 | A1 | * | 10/2006 | Hall | 43/122 |
| 2007/0044371 | A1 | * | 3/2007 | Meier et al. | 43/107 |

* cited by examiner

*Primary Examiner*—Christopher P Ellis
(74) *Attorney, Agent, or Firm*—Christensen O'Connor Johnson Kindness PLLC

(57) ABSTRACT

An insect trap (100) having a transparent or translucent entrapment chamber (110) with a closed upper end, an entry cone (130) disposed therein, a base (140) removably attachable to the entrapment chamber, and a lower container (180) for holding a liquid attractant removably attachable to the base (140), such that evaporating attractant from the container enters the entrapment chamber. The base includes a plurality of entry apertures (150) adapted to permit target insects to enter the trap. A support such as a slotted cone (160) is disposed in the entrapment chamber, and supports a vial (170) of solid attractant. The liquid and solid attractants are able to mix in the trap, and gradually escape through the entry apertures, to generate a plume to attract the target insects toward the entrance apertures.

19 Claims, 4 Drawing Sheets

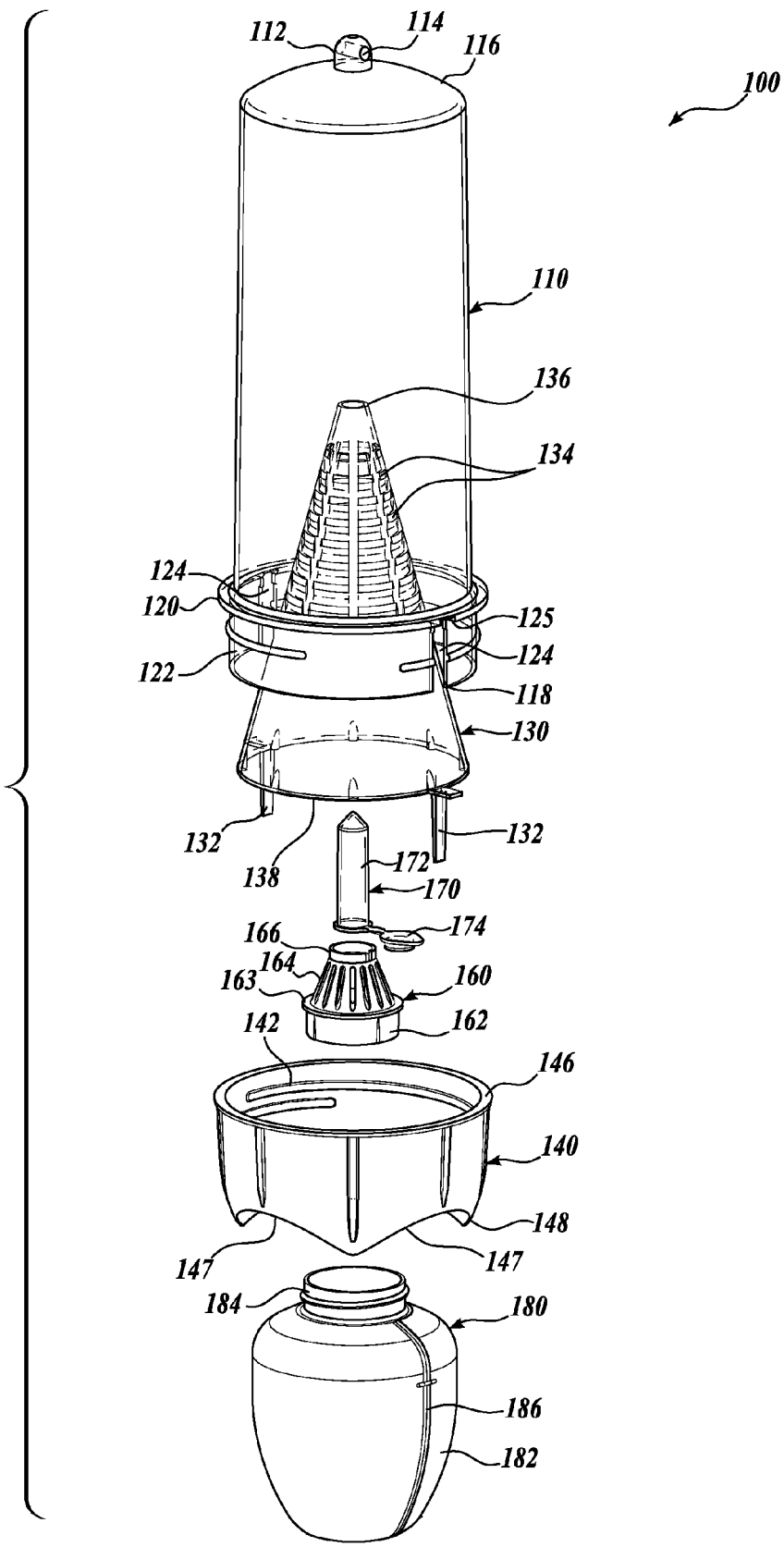

FLYING INSECT TRAP

CROSS-REFERENCE TO RELATED APPLICATION

This application claims the benefit of U.S. Provisional Application No. 60/913,994, filed Apr. 25, 2007, the disclosure of which is hereby expressly incorporated by reference in its entirety, and priority from the filing date of which is hereby claimed under 35 U.S.C. §119.

BACKGROUND

Flying insects, for example various social wasps, including paper wasps, hornets and yellow jackets, can be a significant nuisance, and a potential hazard, to people and animals engaged in outdoor activities. Such flying insects can be prevalent in rural settings, and even in very well developed residential areas.

Traps for flying insects are known in the art, and often have been quite successful at trapping target insects. For example, the inventor of the insect trap disclosed herein pioneered conical element hanging traps, including the wasp traps described and claimed in U.S. Pat. No. 4,551,941, which issued Nov. 12, 1985, to Schneidmiller. Schneidmiller discloses a transparent cylindrical insect trap that is selective to entrapping wasps. A "wasp" is a generic name applied to insects of the order Hymenoptera which includes particularly paper wasps, hornets and yellow jackets. The present inventor also discloses certain improvements to the insect trap in U.S. Pat. No. 5,557,880. Both of these patents are hereby incorporated by reference herein, in their entirety.

Previous patented trap structures include a transparent, generally cylindrical entrapment chamber and a base that attaches to substantially close the bottom of the entrapment chamber. In the prior art device the entrapment chamber includes openings at the top end of the chamber. The bottom element includes apertures that permit access by wasps into the entrapment chamber. An entry cone shaped as a truncated cone with a large opening at the base, and a small opening at the top, is disposed in the entrapment chamber. Wasps or other flying insects enter through the entry apertures, fly or climb into the cone, pass through its truncated end, and become entrapped in the cylindrical chamber. Once inside the chamber, exiting is highly improbable, such that the insect becomes trapped in the chamber. Portions of the trap may be colored and a volatile olfactory attractant may be provided in the bottom element to aid in attracting the wasps.

Although prior art insect traps have proven successful at entrapping wasps and the like, the present invention as disclosed below provides significant improvements that are intended to improve the effectiveness of the insect trap.

SUMMARY

An insect trap for trapping flying insects such as paper wasps, hornets and yellow jackets is disclosed that provides greater flexibility in the type and/or combination of attractants that can be employed.

In a current embodiment, the trap includes an entrapment chamber that is closed at the top, and may be formed as a translucent cylinder. An entry cone is retained in the entrapment chamber, and includes a large opening at the bottom end, and a small opening at the top end. Optionally, a plurality of smaller openings are provided through the wall of the entry cone, and the entry cone further includes retaining tabs that engage corresponding slots in the entrapment chamber. A base, with a plurality of insect entrance apertures is attachable to the entrapment chamber. A lower container suitable for retaining liquids such as water and/or chemical attractants, attaches to the base. When liquid is provided in the lower container, vapors from the lower container enter the base, and generate a vapor plume at one or more of the insect entrance apertures.

The trap may further include a holder for a volatile solid attractant that is disposed over the neck of the lower container. The current holder is a slotted cone having a lower end that is slidably insertable into the neck portion of the lower container, and a receptacle portion that is adapted to retain a vial containing solid attractant.

In a disclosed embodiment, the lower container is bulb-shaped and formed to resemble a hornet's nest.

In a disclosed embodiment, a solid attractant holder is slidably insertable into the neck of the lower container. The solid attractant holder may be formed with a slotted conic portion, and an upper retainer that is sized and shaped to hold a vial containing a solid attractant.

A method for trapping flying insects is disclosed comprising the steps of: providing a trap having an entrapment chamber with a closed top, an entry cone having a large entrance and a small exit aperture, a base removably attachable to the entrapment chamber and defining a plurality of entrance apertures to the entrapment chamber, and a container in fluid communication with the entrapment chamber; providing a liquid attractant in the container; and providing a volatile solid attractant in the entrapment chamber such that vapors from the liquid attractant can mix with vapors from the solid attractant and gradually release through the entrance apertures.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is an exploded view of the flying insect trap shown in FIG. 1;

DETAILED DESCRIPTION

Figure 1:
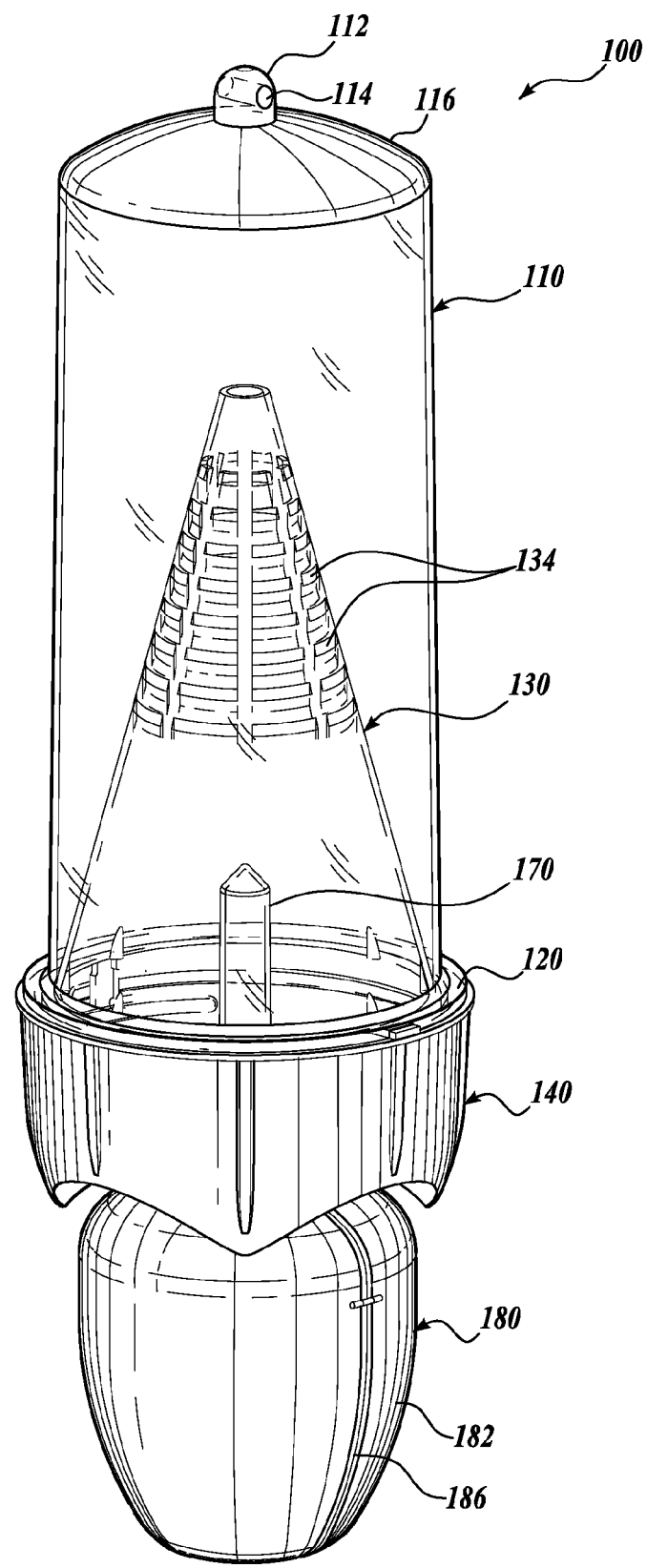
FIG. 1 is a perspective view of a flying insect trap in accordance with the teachings of the present invention.
Figure 4:
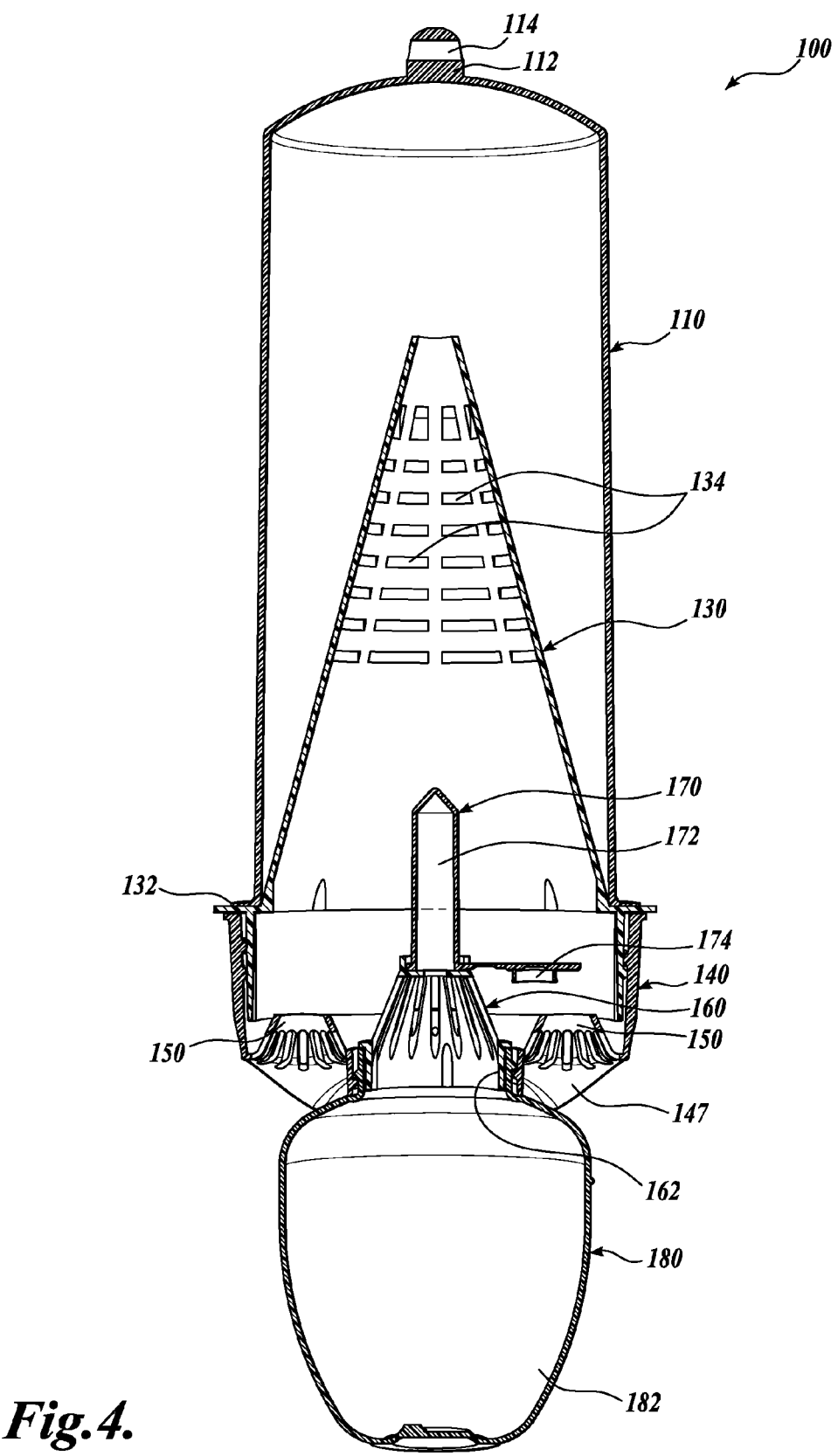
FIG. 4 is a cross sectional side view of the flying insect trap shown in FIG. 1.

A particular embodiment of a flying insect trap 100 according to the present invention, that is particularly suitable for trapping wasps such as paper wasps, yellow jackets and hornets, will now be described in detail, with reference to the FIGURES. FIG. 1 shows a perspective view of the flying insect trap 100, FIG. 2 shows an exploded view of the trap 100, and FIG. 4 shows a cross sectional side view of the trap 100. The trap 100 includes a generally cylindrical entrapment chamber 110, that is preferably transparent or translucent. An integral hanger nib 112 having a transverse aperture 114 therethrough provides means for attaching the trap 100 to a hanger such as a hook, wire, string, strap or the like (not shown), such that the trap 100 can be conveniently hung from a suitable support. The trap 100 is preferably suspended in a location having free access by the target flying insects, and wherein the trap 100 is exposed to substantial sunlight, preferably direct sunlight, for at least a portion of the day.

The cylindrical entrapment chamber 110 is closed at its top end 116, and open at the bottom end 118. An annular flange 120 extends from the entrapment chamber 110 near the bottom end 118, and an externally threaded portion 122 extends below the flange 120. A pair of oppositely disposed vertical slots 124 (FIG. 2) are provided in the threaded portion 122. A top end of the vertical slots 124 includes a protruding or narrowed portion 125 that aids in retaining an entry cone 130, as discussed below.

The entrapment chamber 110 is preferably formed from a relatively rigid, transparent or translucent plastic having good light reflection and transmission characteristics, such that in sunlight the chamber 110 will provide a bright object for attracting flying insects, and will appear relatively bright when viewed from the insect entrance apertures (described below). The color of the chamber 110 may also be selected to preferentially attract the target insects.

The entry cone 130 in this embodiment is a truncated-cone insert, and is disposed inside the entrapment chamber 110. The entry cone 130 is sized to fit snugly within the open bottom end 118 of the chamber 110, with the top end 136 extending part of the way towards the top end 116 of the chamber 110. The entry cone 130 includes a pair of oppositely disposed L-shaped tabs 132 that are sized and shaped to engage the vertical slots 124 in the chamber 110, to releasably retain the entry cone 130 in the chamber 110. The horizontal portion of the L-shaped tabs 132 is sized to frictionally engage the narrowed portions 125 of the slots 124 to retain the entry cone 130 therein, to facilitate emptying and re-assembly of the trap 100. The entry cone 130 is preferably formed from a transparent or translucent material to permit the passage of light therethrough.

The base 138 of the entry cone 130 is sized to fit inside the bottom end 118 of the chamber 110. The top end 136 of the entry cone 130 is open, defining an aperture that is sized to permit the target insect(s) to pass therethrough. An upper portion of the entry cone 130 is perforated with a plurality of apertures 134 that facilitate the target insects climbing toward the top end 136 of the entry cone 130. The apertures 134 in the upper portion also improve light transmission therethrough, such that generally the upper portion of the entry cone 130 will be brighter than the lower portion, which will tend to attract light-sensitive insects such as wasps towards the top of the cone 136.

The lower portion of the trap 100 includes a base 140, a small slotted cone 160, an attractant vial 170 and a lower container 180. The base 140 is preferably opaque and includes an internally threaded portion 142 that is adapted to engage the threaded portion 122 of the chamber 110. The base 140 includes a circular upper edge 146 that generally abuts the chamber flange 120 when the trap 100 is assembled. The bottom end 148 of the base member 140 includes a plurality of arcuate surfaces 147 that are sized and positioned to encourage the target insects to enter the trap 100.

Figure 3A:
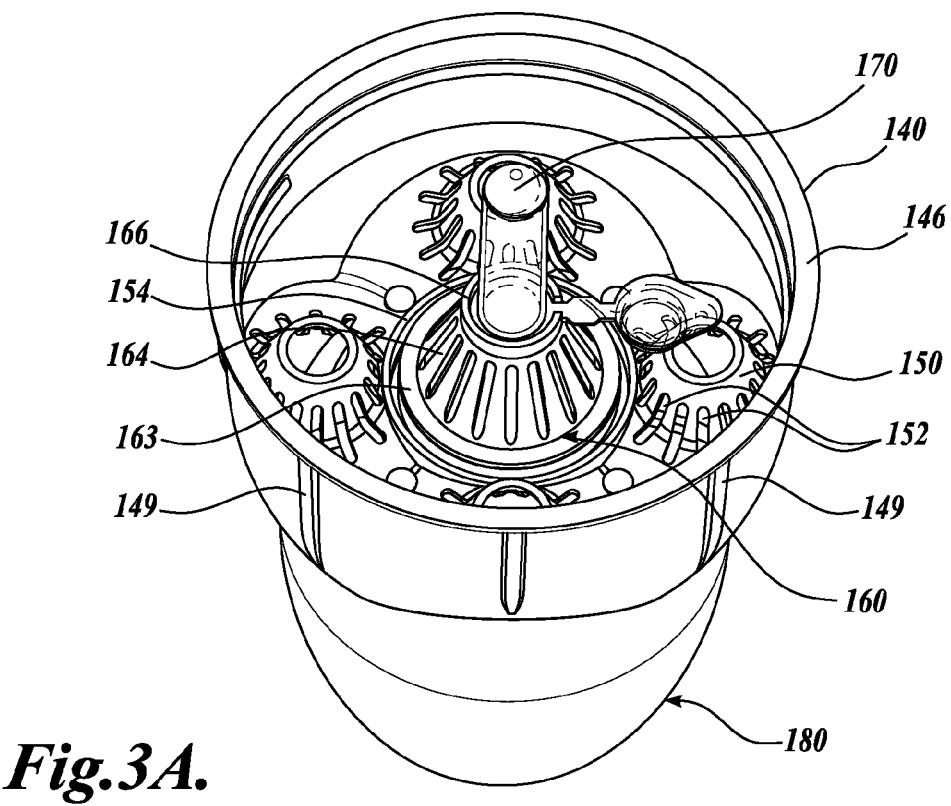
FIG. 3A is an upper perspective view of the lower portion of the flying insect trap shown in FIG. 1, showing the interior of the lower portion.
Figure 3B:
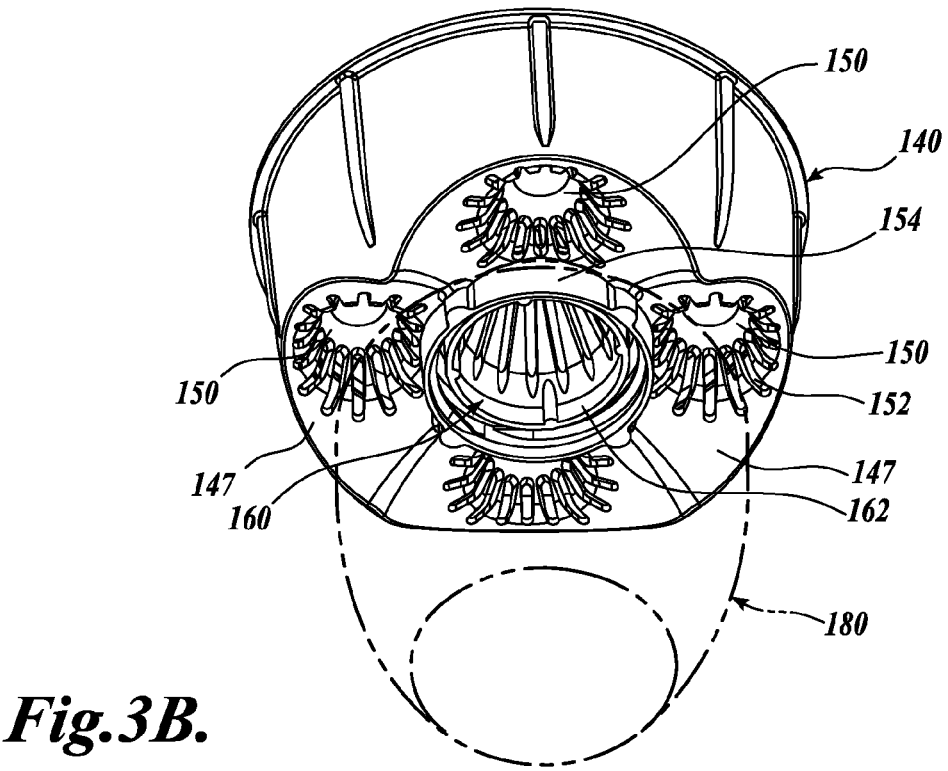
FIG. 3B is a lower perspective view of the bottom portion of the flying insect trap shown in FIG. 1 with the lower container shown in phantom.

Refer now also to FIGS. 3A and 3B, which show an upper and lower perspective view of the lower portion of the trap 100, respectively, including the base 140, the small slotted cone 160, the attractant vial 170 and a lower container 180 (shown in phantom in FIG. 3B). The base 140 includes a number of grip protrusions 149, to facilitate assembly and disassembly of the trap 100. The bottom end 148 of the base 140 includes an insect entrance aperture 150 in each of the arcuate surfaces 147 (four shown). The entrance apertures 150 are sized to accommodate the target insects, for example wasps, and are designed to encourage the wasps to enter the trap 100, while discouraging egress from the trap 100. In particular, the entrance apertures 150 are tapered from a relatively large diameter at the base to a smaller diameter at the top, and the entrance apertures are provided with a plurality of open slots 152. The slots 152 are too small for the target insects to pass through, but permit the passage of air, light and attractant therethrough.

A center threaded aperture 154 on the base 140 (FIG. 3B) is adapted to threadably receive the lower container 180. The lower container 180 includes a bulb-shaped body 182 and a threaded neck 184 (FIG. 2) such that the lower container 180 is attachable to the base 140 at the base threaded aperture 154. The lower container 180 is water-tight and is adapted to contain a liquid, such as an insect attractant and/or water. The lower container 180 is preferably opaque with a relatively dull finish so that the target insects will not be distracted by the lower container 180, and will instead be attracted by light towards the entrapment chamber 110. A narrow fill level viewer 186 may optionally be provided to permit the user to readily determine the fluid level within the container 180. The lower container 180 is preferably bulb-shaped somewhat mimicking the shape of certain wasp nests, which may also provide a visual attractant cue to draw the target insects towards the trap 100. The bulb-shaped lower container 180 also has ergonomic advantages, permitting easy grasping for removing the container 100 from the base 140.

The small slotted cone 160 includes a cylindrical lower portion 162 that is sized to fit in the open neck 184 of the container 180. The cylindrical lower portion 162 includes a retaining flange 163 that is sized to prevent the small slotted cone 160 from falling into the lower container 180. A middle cone section 164 defining a plurality of slots therethrough extends upwardly from the lower portion 162. The top of the small slotted cone 160 defines a cup-shaped receptacle 166 that is sized to receive and retain the attractant vial 170.

The attractant vial 170 is a closable container for an olfactory attractant for the target insects. Preferably, the attractant is a volatile attractant in a polyurethane matrix that is formed into a solid. The attractant will evaporative and escape from the vial over a period of time. It is contemplated that the volatile attractant in the vial 170 will mix with vapors from a chemical attractant and/or water in the lower container 180. The mixed vapors exit through slots in the middle section 164 of the small slotted cone 160.

This new trap 100, therefore, enables the use of both solid and liquid attractants in a single trap, and in particular permits the user great flexibility in selecting from a range and combination of attractants. The trap 100 combines the benefits of both wet traps and dry traps.

The attractant vial 170 includes a container portion 172 and a removable lid 174 that closes the container portion 172. Although the vial 170 is shown in an inverted position with the removable lid 174 disposed downwardly, it is contemplated that for some applications and combinations of attractants it may be desirable to orient the vial 170 with the open end of the container portion 172 facing upwardly.

To use the trap 100 a user may simply remove the lower container 180, small slotted cone 160 and attractant vial 170 as a unit by unscrewing the lower container 180 from the base 140. The small cone 160 may then be removed from the container to provide access to the neck 184, and the user places a desired quantity of chemical attractant in liquid form and/or water into the container 180. The small cone 160 is then placed in the neck 184, and a vial 170 of solid attractant is uncapped and positioned to be retained by the receptacle 166 at the top of the small cone 160. The vial 170, small cone 160 and lower container 180 are then attached to the base 140, and the trap 100 is positioned in a suitable location.

To empty the trap 100 of insect carcasses, the user retrieves the trap 100, removes the base 140 by unscrewing it from the entrapment container 110, and (at a suitable location) removes the entry cone 130 by pressing downwardly on the entry cone tabs 132. The trap 100 may then be reassembled by reinserting the entry cone 130, replacing any attractant as desired, and re-attaching the base 140 to the entrapment container 110.

It will be appreciated that one aspect of the present trap 100 is that the top end 116 of the entrapment chamber 110 is closed, rather than having apertures, slots or other openings into the chamber 110. The attractants released from the vial 170 and/or from the lower container 180, therefore, can therefore substantially only exit the trap 100 through the insect entrance apertures 150 in the base 140. As the attractants release through the entrance apertures 150, the attractant plume will therefore attract the target insects toward the entrance apertures 150.

Another aspect of the trap 100 is that the base 140 and the lower container 180 are shaped to cooperatively provide a convenient perch for the target insects directly below the entrance apertures 150, from which the insects may then be induced to enter the entrapment chamber 110. In particular, as may be best appreciated from FIG. 4, in combination with the shape and position of the arcuate surfaces 147, from the perch provided by the lower container 180 the target insects will sense a relatively lighter region directly thereabove, and will therefore be induced to enter the trap 100.

While illustrative embodiments have been illustrated and described, it will be appreciated that various changes can be made therein without departing from the spirit and scope of the invention. For example, the entrapment chamber 100 may be shaped other than as a cylinder. It is contemplated, for example, that the entrapment chamber may be tapered, or alternatively shaped for aesthetic and/or marketing reasons. The "entry cone" as used herein refers to a device having a large aperture at the bottom and a smaller aperture at the top, and is not intended to be restrictively interpreted. In particular, the entry cone 130 may taper in a non-liner manner, and/or may have a non-axisymmetric shape. Although the bulb-shape of the lower container is preferred, other shapes are clearly possible, without departing from the present invention. Where threaded attachments are shown, it will be appreciated that other attachment mechanisms may be used, as are well-known in the art, including friction fit, locking tabs, detents, and the like.

The invention claimed is:

1. A flying insect trap comprising:
   an entrapment chamber having a closed top end and an open bottom end;
   an entry cone having a small upper aperture and a lower end that is sized and shaped to be retained in the entrapment chamber;
   a base removably attachable to the open bottom end of the entrapment chamber, the base further comprising a plurality of insect entrance apertures, wherein the entrance apertures are tapered;
   a bulb-shaped lower container that is removably attachable to the base;
   wherein the lower container is in fluid communication with the entrapment chamber.

2. The flying insect trap of claim 1, wherein the entrapment chamber is a translucent cylinder.

3. The flying insect trap of claim 1, wherein an upper portion of the entry cone includes a plurality of apertures therethrough.

4. The flying insect trap of claim 1, wherein the entry cone includes a plurality of retaining tabs that engage corresponding slots in the entrapment chamber, whereby the entry cone is retainable by the entrapment chamber.

5. The flying insect trap of claim 1, wherein the entry cone is translucent.

6. The flying insect trap of claim 1, wherein the lower container comprises a body portion and a neck portion.

7. The flying insect trap of claim 6, further comprising a solid attractant holder, wherein the solid attractant holder is disposed over the neck portion of the lower container.

8. The flying insect trap of claim 7, wherein the solid attractant holder comprises a slotted cone having a lower end that is slidably insertable into the neck portion of the lower container, and a receptacle portion that is configured to retain a vial containing solid attractant.

9. The flying insect trap of claim 8, wherein the lower container and the slotted cone are removable from the base by unscrewing the lower container from the base.

10. The flying insect trap of claim 1, wherein the lower container further comprises a fill level viewer.

11. The flying insect trap of claim 1, wherein the base includes a bottom end defining a plurality of arcuate surfaces and a plurality of entry apertures.

12. The flying insect trap of claim 11, wherein the tapered entry apertures each comprise a plurality of open slots.

13. The flying insect trap of claim 6, wherein the lower container body portion is shaped to resemble a wasp nest.

14. A wasp trap comprising:
   a cylindrical, translucent chamber having an open bottom end and a closed top end;
   entry means disposed in the chamber, the entry means having at least one aperture sized to accommodate entry therethrough by a wasp;
   a base removably attachable to the chamber, the base having a bottom surface defining a plurality of arcuate surfaces and a plurality of tapered entrance apertures;
   a bulb-shaped container having a body portion and a neck portion, the container being removably attachable to the base; and
   attractant holder means for holding a vial of attractant over the container.

15. The wasp trap of claim 14, wherein the entry means comprises a truncated cone.

16. The wasp trap of claim 14, wherein the tapered entrance apertures in the base comprises a plurality of peripheral slots.

17. The wasp trap of claim 14, wherein the container screwably attaches to the base.

18. The wasp trap of claim 17, wherein the container is adapted to contain a liquid attractant.

19. The wasp trap of claim 17, wherein the attractant holder means comprises a slotted cone having a lower portion sized to slidably engage the neck portion of the container, and a receptacle portion adapted to hold a vial of solid attractant.

* * * * *